United States Patent [19]

Rastetter et al.

[11] Patent Number: 5,662,367
[45] Date of Patent: Sep. 2, 1997

[54] REMOVABLE MOTOR VEHICLES REAR SEAT

[75] Inventors: Ina Rastetter, Althengstett; Walter Schmid, Maichingen; Werner Hauser, Calw; Rolf Mitschelen, Kirchheim/Teck, all of Germany

[73] Assignee: Mercedes-Benz AG, Germany

[21] Appl. No.: 523,608

[22] Filed: Sep. 5, 1995

[30] Foreign Application Priority Data

Sep. 2, 1994 [DE] Germany .................. 44 31 248.2

[51] Int. Cl.$^6$ ............................................... B60N 2/32
[52] U.S. Cl. ..................... 296/65.1; 297/344.15; 248/419
[58] Field of Search .............. 296/65.1, 63; 248/419, 248/420, 421, 423, 429; 297/344.1, 344.12–344.15, 451.2

[56] References Cited

U.S. PATENT DOCUMENTS

| | | | |
|---|---|---|---|
| 3,313,571 | 4/1967 | Ferrara | 297/239 |
| 3,897,974 | 8/1975 | Barecki | 297/451 |
| 3,915,493 | 10/1975 | Brown | 296/63 |
| 4,047,759 | 9/1977 | Koscinski | 297/346 |
| 4,836,597 | 6/1989 | Izumida | 296/63 |
| 4,884,840 | 12/1989 | Linden et al. | 297/320 |
| 4,904,018 | 2/1990 | Demick | 297/4 |
| 4,946,216 | 8/1990 | Demick | 296/63 |
| 4,978,158 | 12/1990 | Kubo et al. | 296/65.1 |
| 5,183,313 | 2/1993 | Cunningham | 297/344 |
| 5,195,795 | 3/1993 | Cannera et al. | 296/65.1 |
| 5,234,189 | 8/1993 | Myers | 248/429 |
| 5,443,239 | 8/1995 | Laporte | 248/503.1 |

FOREIGN PATENT DOCUMENTS 0 397 333 A2 11/1990 European Pat. Off. .
0 537 078 A1 4/1993 European Pat. Off. .

*Primary Examiner*—David M. Mitchell
*Assistant Examiner*—Jonathan J. Yun
*Attorney, Agent, or Firm*—Evenson, McKeown, Edwards & Lenahan, P.L.L.C

[57] ABSTRACT

A removable rear seat for motor vehicles, in particular for Estate cars with a variable-volume loading space, having a rigid seat bench and a seat-bench substructure for fixing the seat height. The substructure is fixed on the floor of the vehicle body via releasable anchorage locations. In order to provide a rear seat which is manageable, easy to remove, and makes optimum use of the resulting free space after the rear seat has been removed, the seat-bench substructure is connected releasably, at its end remote from the anchorage locations, to the seat bench and is retained in its anchorage location. Thus, it can be pivoted out of a use position into a stowage position on or in the floor of the vehicle body and vice versa. At least one manually actuatable locking device locks the seat-bench substructure in its use position and determines the seat height.

17 Claims, 5 Drawing Sheets

REMOVABLE MOTOR VEHICLES REAR SEAT

BACKGROUND AND SUMMARY OF THE INVENTION

The present invention relates to a removable rear seat for motor vehicles, in particular for Estate cars with a variable-volume loading space and a planar loading surface area. More particularly, the present invention relates to a removable rear seat comprising a rigid, seat bench, a seat-bench substructure for fixing the seat height and releasable anchorage locations for fastening the substructure on the floor of the vehicle body.

Removable rear seats are preferably used in Estate cars in order to be able to utilize as an additional loading area the free space which results from the rear seat being removed. For example, in EP 0 397 333 A2, a seat bench and a seat-bench substructure form a structural unit. The seat-bench substructure is formed by a pair of laterally arranged bases which project away downwards from the seat bench and are retained releasably in two inserts in the vehicle floor. Each insert has two anchor bolts which are arranged at a longitudinal distance from one another and extend transversely with respect to the longitudinal axis of the vehicle. Slots for engaging around the anchor bolt and manual locking hooks for engaging over the anchor bolts inserted into the slots are provided on the bases of the seat-bench substructure. Due to its bulkiness and its weight, the known rear seat is relatively unwieldy during removal and always has to be removed completely from the vehicle in order to increase the loading area, even when only a partial increase is required.

In the rear seat described in EP 0 537 078 A1, the seat bench is likewise connected in a non-separable manner to the seat-bench substructure. The seat-bench substructure comprises a frame, which carries the seat bench, and four feet which are retained releasably on the vehicle floor in the anchorage locations and are connected pivotably to the frame. Once the anchorage of the two rear feet have been released, the seat bench, along with the frame, can be pivoted forwards about the pivot axis between frame and front feet and can be rested against the backrest of the front vehicle seats. After release of all the anchorages on the feet, the rear seat can be fully removed from the vehicle. This operation likewise is relatively unwieldy and requires much exertion. By providing two different anchorage positions in each anchorage location, the rear seat can be installed in two positions which are displaced with respect to one another in the longitudinal direction of the vehicle and permit either a larger amount of legroom or a larger loading area.

An object of the present invention is to configure a rear seat which is lightweight and manageable during removal such that, after removal, the resulting free space has a planar surface area and can be utilized to the optimum extent.

The foregoing object has been achieved according to the present invention with a removable rear seat for motor vehicles in which the seat-bench substructure is connected, at an end thereof remote from the releasable anchorage locations, to the seat bench and is configured to be retained at the releasable anchorage locations so that it can be pivoted into and out of a use position which predetermines the seat height, into a stowage position in one of on and in a vehicle body floor. At least one manually actuatable locking device is operatively associated with the seat-bench substructure to lock the seat-bench substructure in the use position thereof at selected ones of the releasable anchorage positions.

By the separation of the seat bench and seat-bench substructure directly beneath the seat cushion of the rear seat according to the present invention and by the fold-away configuration of the seat-bench substructure remaining in the vehicle, very simple and user-friendly dismounting and mounting of the rear seat for the purpose of increasing the loading area or providing other free space is achieved. The seat bench, which can be removed from the vehicle without the seat-bench substructure, is lightweight, flat and extremely manageable. The seat-bench substructure remaining in the vehicle does not diminish the volume of the loading area or the planar surface area thereof, because it is fully lowered into the vehicle floor.

According to one currently preferred embodiment of the invention, the seat-bench substructure is of a two-part configuration and exhibits a front and rear substructure part, as seen in the longitudinal axis of the vehicle. Each substructure part is retained pivotably in its anchorage location and is connected releasably to the seat bench. Each substructure part is assigned a locking device which arrests the substructure part in its use position at least within the anchorage location. By virtue of this two-part configuration, the seat bench can be left in the vehicle when all that is required is a slight increase in the free space or loading area. In this situation, all that is needed is for the connection between the seat bench and the rear substructure part to be released, whereupon the rear seat can be pivoted by its connecting locations to the front substructure parts and swung against the back of the front seats. However, for this purpose, the front substructure part remains in its locked use position, and the rear substructure part, after unlocking, is pivoted into its stowage position in the vehicle floor.

A particularly advantageous feature of the two-part seat-bench substructure is achieved if the front substructure part has two anchorage locations which are preferably arranged symmetrically with respect to the longitudinal axis of the vehicle, and the rear substructure part has one anchorage location which is arranged centrally, preferably on the longitudinal axis of the vehicle.

According to an advantageous embodiment of the invention, the rear substructure part, then, has a longitudinal carrier, which is pivotably mounted at the ends in the anchorage location between two retaining webs and is preferably configured as a box-shaped hollow profile, and two transverse carriers which are fixedly connected to the longitudinal carrier, extend on opposite sides of the longitudinal carrier, transversely with respect to the longitudinal axis of the vehicle, and are preferably likewise designed as box-shaped profiles.

The locking device assigned to the rear substructure part can have a locking bolt, arranged between the retaining webs, and at least one locking hook, which is mounted in a rotationally movable manner on the longitudinal carrier. In the use position of the seat-bench structure, the locking hook engages over the locking bolt in a positively locking manner. Two latching bolts can each be displaced axially with respect to the longitudinal axis of the vehicle to engage, under the spring force of a locking spring, into latching holes in each side wall of the vehicle body. In this embodiment, the latching holes are preferably provided in metal side plates fastened on the wheel arches. This achieves crash-resistant locking of the rear substructure part on the vehicle body despite only one anchorage location on the vehicle floor.

In another currently preferred embodiment of the invention, the locking device is equipped with a hand lever which is coupled, via a connector preferably configured as Bowden cables, to the two latching bolts in the transverse carriers and the at least one locking hook in the anchorage location. This has the advantage that only a single hand lever has to be operated in order to unlock longitudinal and transverse carriers and, at the same time, achieve locking of the rear substructure part on the vehicle body which can absorb large crash forces. The stable configuration of the rear substructure part with hollow profile likewise absorbs the forces resulting from an impact. Consequently, according to a further advantageous aspect of the present invention, the belt buckles for the two safety belts of the rear seats can be fastened on the longitudinal carrier so as to pass through the seat bench.

According to a still further currently preferred embodiment of the invention, the front substructure part is formed by two pivot arms which are each mounted pivotably at the ends on retaining webs at an anchorage location and are connected to one another via a transverse rod extending at right angles with respect to the longitudinal axis of the vehicle. The locking device assigned to the front substructure part takes effect, in at least one of the two anchorage locations, between pivot arm and retaining web and can be released by an unlocking lever. Preferably in this arrangement, the locking device has a locking bolt, projecting transversely on the pivot arm, and the bolt-receiving structure which is fixedly connected to the retaining web and has a rotary latch, into which the bolt latches in the use position of the seat-bench substructure. The unlocking lever acts on a blocking plate blocking the rotary latch and, for unlocking, pivots said blocking plate away from the rotary latch in order to release the locking bolt.

Self-engaging locks with a manual release lever, which are arranged between seat bench, and the upper end of the pivot arms and upper side of the transverse carriers are provided for the releasable connection of seat-bench and seat-bench substructure. Each lock has a lock bolt, a bolt-receiver and a blocking lever which engages over the lock bolt positioned in the bolt-receiver and which can be pivoted counter to the force of a closure spring in order to open the lock via the release lever. These types of locks permit a relative rotary movement of the lock bolts in the bolt-receiver, with the result that, after releasing the locks on the rear substructure part, the locks of the front structure parts serve as pivot bearings for the swinging-up movement of the seat bench.

The retaining webs in the anchorage locations of the rear and front substructure parts can be retained longitudinally displaceably in guide rails extending parallel to the longitudinal axis of the vehicle. A latching device which latches the retaining webs in at least two displacement positions in the associated guide rail is provided in at least one of the anchorage locations. In each side wall of the vehicle body, provision is made, then, for two latching holes which are each assigned to one of the two displacement positions and are intended for receiving the latching bolts in the transverse carriers. By virtue of this configuration of the seat-bench substructure, the rear seats can be used in the vehicle in two different positions at different spacings from the front seats of the vehicle. One rear-seat position provides the seat users with a larger amount of legroom, and the other rear-seat position increases the loading area located behind the rear seat.

The latching device can be assigned to one anchorage location of the rear substructure part and can have a latching bolt which can be displaced vertically on the retaining web. The latching bolt latches into two latching holes, which are arranged at a distance apart in the guide rail, under the action of a latching spring. An unlocking member which acts on the latching bolt lifts the latching bolt, upon actuation, out of the latching hole counter to the force of the latching spring. The unlocking member preferably is formed by a Bowden cable which is coupled to the hand lever of the locking device assigned to the rear substructure part. The front and rear substructure parts are connected to one another by a connecting rod extending in or parallel to the longitudinal axis of the vehicle. As a result, the front substructure part can also be displaced into the respective seat position and retained there.

In the stowage position of the seat-bench substructure, the front and rear substructure parts can rest with contact pressure on the floor of the vehicle body. In each case, one damping element, preferably a rubber block, is arranged between the pivot arms of the front substructure part and the pivotable longitudinal carrier of the rear substructure part and the floor of the vehicle body. This arrangement ensures that the seat-bench substructure remaining in the vehicle is positioned therein without any rattling.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
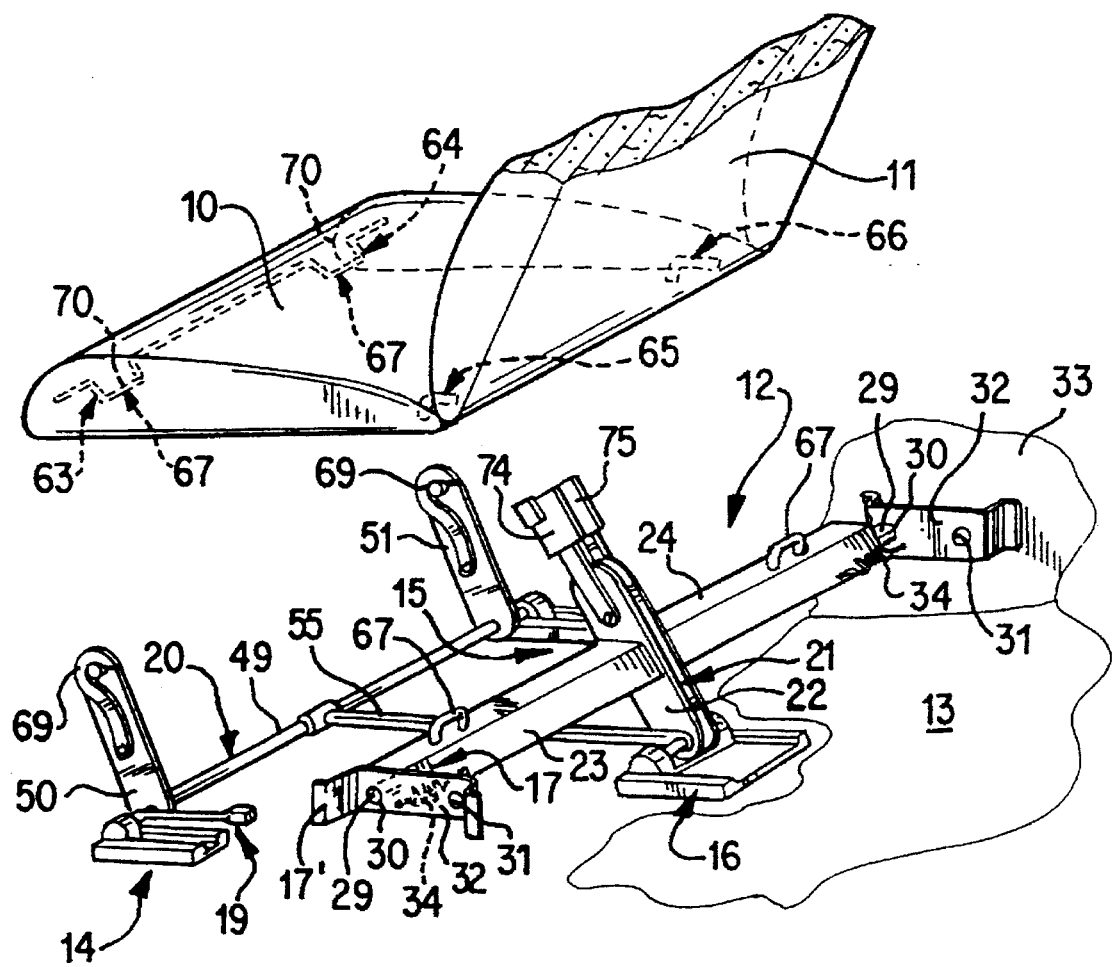
FIG. 1 is a perspective view of a rear seat for an Estate car in the demounted state.

The rear seat represented in FIG. 1 is intended for an Estate car with a variable-volume loading area and a planar loading surface area. The rear seat has a rigid, upholstered seat bench 10, with a backrest 11 fastened thereon, and a seat-bench substructure designated generally by numeral 12 for fixing the seat height above the floor 13 of the vehicle body. A section of the floor is also shown in FIG. 1.

The seat-bench substructure 12 is fixed in a total of three anchorage locations 14, 15 and 16 in the floor 13 of the vehicle body, called the vehicle floor 13 hereinbelow. The anchorage location 14, 15, and 16 preferably is arranged beneath the planar loading surface area. The seat-bench substructure 12 and the anchorage locations 14, 15, 16 are configured to absorb the forces occurring in the event of a crash.

The seat-bench substructure 12 is connected releasably, at its end remote from the anchorage locations 14, 15, 16, to the seat bench 10 and is retained in its anchorage location 14, 15, 16 so that it can be pivoted about pivot axes, extending transversely with respect to the longitudinal axis of the vehicle, out of its use position, which is illustrated in FIG. 1 and predetermines the seat height with respect to the vehicle floor 13, into the stowage position on or in the vehicle floor 13.

In the illustrated use position, the seat-bench substructure 12 is locked on the vehicle body by locking devices 17 and 19 and, in its stowage position, is positioned, in the vehicle floor 13 under spring prestressing, flush with the upper side of the vehicle floor 13. In the latter case, in order to avoid rattling noises, the seat-bench substructure 12 rests in a frictionally locking manner, by spring prestressing, against damping elements retained in the vehicle floor 13, e.g. rubber blocks 18 as seen more clearly in FIG. 2.

The seat-bench substructure 12 is of a two-part configuration and has a front substructure part 20 and a rear substructure part 21, as seen in the longitudinal axis of the vehicle, which are each retained pivotably independently in their anchorage locations 14, 15 and 16 and are connected releasably to the seat bench 10. In this arrangement, a locking device 17 is assigned to the rear substructure part 21, while the front substructure part 20 can be arrested in its use position by a locking device 19 acting in the anchorage location 14.

More specifically, the rear substructure part 21 comprises a longitudinal carrier 22 which can be pivoted, in a vertical plane running through the longitudinal axis of the vehicle, about the pivot axis located in the anchorage location 16 of the longitudinal carrier, and also comprises two transverse carriers 23, 24 which are fixedly connected to the longitudinal carrier 22, extend in opposite sides of the longitudinal carrier 22, transversely with respect to the longitudinal axis of the vehicle, and are connected rigidly thereto. The longitudinal carrier 22 and the two transverse carriers 23, 24 are box-shaped hollow profiles.

Figure 3:
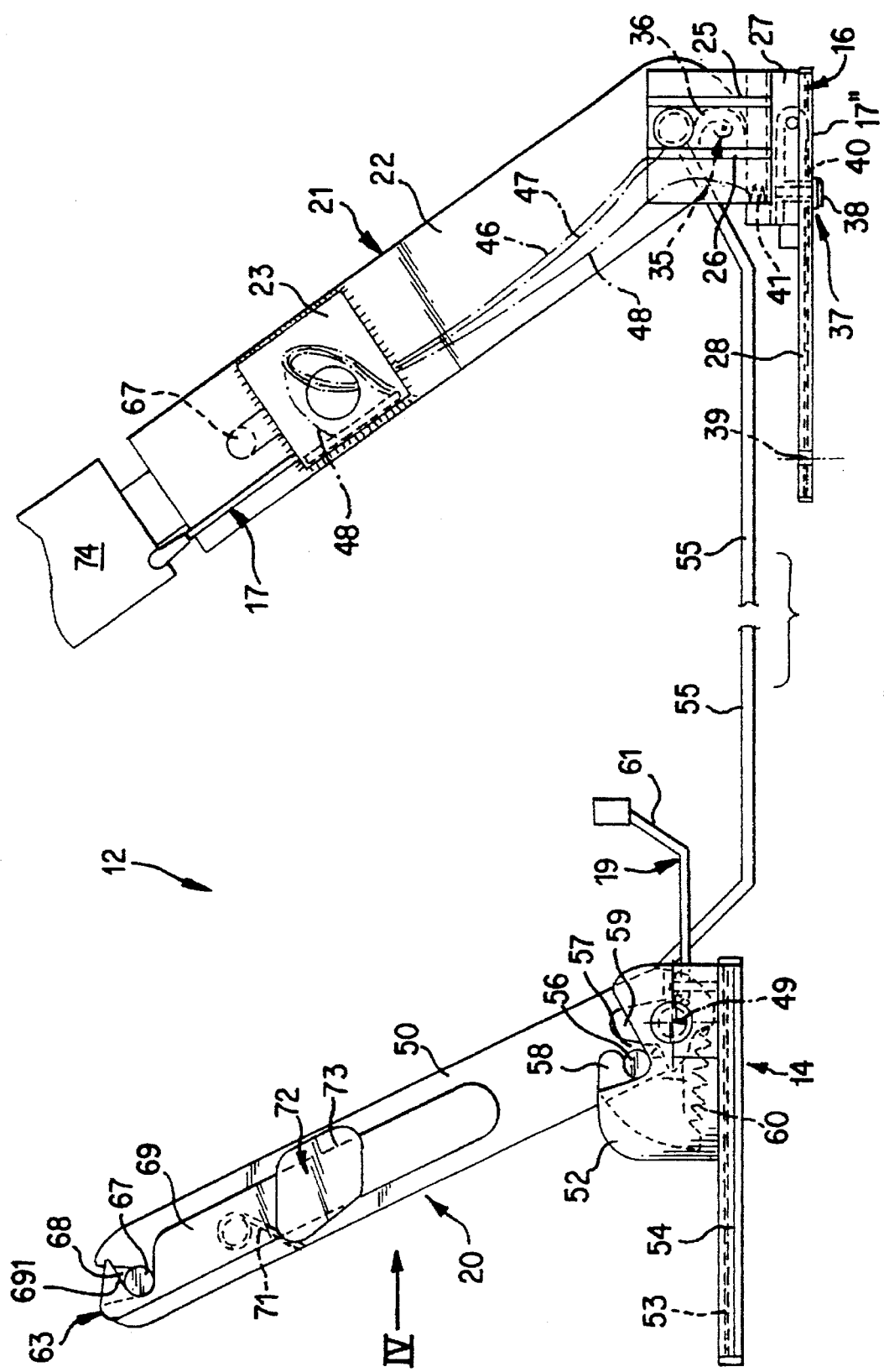
FIG. 3 is a more detailed side view of the seat-bench substructure of the rear seat in FIG. 1.
Figure 4:
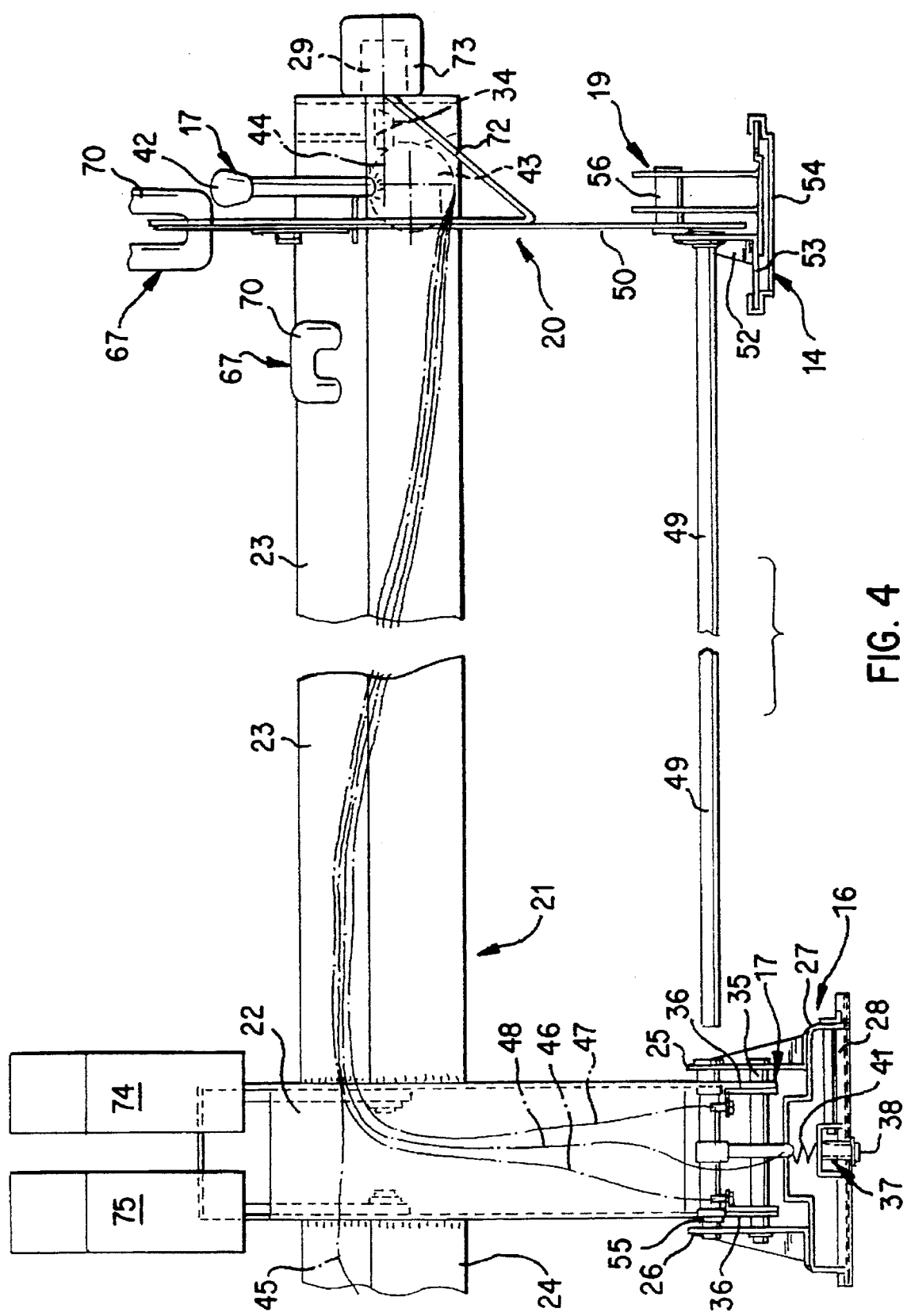
FIG. 4 is a partial view of the seat-bench substructure in the direction of arrow IV in FIG. 3.

As can be seen, in particular, from FIGS. 3 and 4, the longitudinal carrier 22 is articulated on two retaining webs 25, 26 in the anchorage location 16. The two retaining webs 25, 26 are fastened on a base plate 27 which is guided axially displaceably in a guide rail 28 extending in the direction of the longitudinal axis of the vehicle. In order to lock the rear substructure part 21, the locking device 17 has a first locking part 17' acting on the side walls of the vehicle body, and a second locking part 17" (FIG. 3) which takes effect in the anchorage location 16. The first locking part 17' comprises two latching bolts 29 which can be axially displaced transversely with respect to the longitudinal axis of the vehicle. The latching bolts 29 are arranged at the free end of the transverse carriers 23, 24 and interact with two latching holes 30, 31 on each side of the vehicle body in order to lock the rear substructure part 21.

The two latching holes 30, 31 are arranged at a longitudinal spacing from one another in a metal fastening plate 32. In each case, one metal fastening plate 32 is fastened on the left-hand and right-hand wheel arches of the vehicle body. The wheel arches are identified generally by numeral 33 in FIG. 1. Depending on the displacement position of the base plate 27 in the guide rail 28, the two latching bolts 29 each latch, under the action of the locking spring 34, either into the two latching holes 30 or into the two latching holes 31 of the metal fastening plates 32, and thus arrest the rear substructure part 21 on the side of the vehicle body.

As is only indicated generally in FIG. 1 but seen in greater detail in FIGS. 3 and 4, the locking part 17" of the locking device 17 which takes effect in the anchorage location 16 includes a locking bolt 35 arranged between the retaining webs 25, 26 in the anchorage location 16, and two locking hooks 36 which are mounted in a rotationally movable manner on the longitudinal carrier 22. In the use position of the substructure part 21, each hook 36 engages over the locking bolt 35 in a positively locking manner and arrests the rear substructure part 21 in the use position.

The base plate 27, which can be displaced in the guide rail 28, is locked in two displacement positions in the guide rail 28 by a latching device 37. For this purpose, a vertically displaceable latching bolt 38 is provided on the base plate 27 and two longitudinally spaced apart latching holes 39, 40 are provided on the guide rail 28. The latching bolt 38 latches into the latching holes 39, 40 under the action of the latching spring 41 configured as a compression spring.

The locking device 17 assigned to the rear substructure part 21 has, for the joint actuation of its two locking parts 17', 17" and in addition to the latching device 37, a hand lever 42 which is rigidly connected to a control disk 43 arranged pivotably in one transverse carrier 23 as shown in FIG. 4. The ends of a total of five Bowden cables 44 through 48 are fastened on the control disk 43. The two Bowden cables 44, 45 lead to a latching bolt 29 at the ends of the two transverse carriers 23, 24 and are fixedly connected thereto. The Bowden cables 46, 47, 48 lead to the anchorage location 16, with the two Bowden cables 46, 47 each acting on a locking hook 36, and the Bowden cable 48 being connected to the latching bolt 38 of the latching device 37.

When the hand lever 42 in FIG. 4 is pivoted in the counterclockwise direction, then the Bowden cables 44, 45, 46, 47, 48 are actuated. Consequently, the latching bolts 29 are drawn out of the latching holes 30, 31 in the metal fastening plates 32, the locking hooks 36 are pivoted away from the locking bolt 35, and the latching bolt 38 is lifted out of the latching hole 39 or 40 counter to the action of the latching spring 41. The rear substructure part 21 is thus unlocked and, on one hand, can be pivoted towards the vehicle floor 13 and, on the other hand, can be displaced into another locking position within the guide rail 28.

The front substructure part 20 includes two pivot arms 50, 51 which are each mounted pivotably at the end in one of the two anchorage locations 14, 15, arranged symmetrically with respect to the longitudinal axis of the vehicle. The pivot arms 50, 51 are seated in a rotationally fixed manner on a transverse rod 49 extending at right angles with respect to the longitudinal axis of the vehicle. As can be seen, in particular, from FIGS. 3 and 4, the transverse rod 49 is mounted rotatably in a retaining web 52 in each of the two anchorage locations 14, 15. Each retaining web 52 is fastened on a base plate 53, such that it projects upwards at right angles from the base plate 53.

In each of the two anchorage locations 14, 15, the base plate 53 is retained in a longitudinally displaceable manner in a guide rail 54 fastened in the vehicle floor 13. The guide rails 54 are aligned parallel to the guide rail 28 in the rear anchorage location 16. Arranged between the transverse rod 49 and the longitudinal carrier 22 of the rear substructure part 21 is a connecting rod 55 (FIGS. 1, 3 and 4) which acts in a rotationally movable manner both on the transverse rod 49 and on the longitudinal carrier 22, in the pivot axis of the latter.

By virtue of the connecting rod 55, the front substructure part 20 takes part in the longitudinal displacement of the rear substructure part 21. The two pivot arms 50, 51 are displaced in the same manner in the guide rails 54 within the anchorage locations 14, 15. If the rear base plate 57 is latched by the latching device 37 in one of the locking locations (latching hole 39 or 40), then the base plates 53 are also automatically fixed non-displaceably in the longitudinal direction in the two guide rails 54 via the connecting rod 55.

The locking device 19 assigned to and locking the front substructure part 20 in the use position is at the anchorage location 14 and is effective between the retaining web 52 and the pivot arm 50. In particular, the locking device 19 has a locking bolt 56 (FIGS. 3 and 4), which projects transversely on the pivot arm 50, and at least one bolt-receiver 57 (FIG. 3) which is fixedly connected to the base plate 53, into which the locking bolt 56 latches in the use position on the front substructure part 20 and locks the pivot arm 50, and thus also the pivot arm 51 via the transverse rod 49, in the use position.

As can be seen from FIG. 3, a rotary latch 58 is mounted pivotably on the bolt-receiver 57 and engages over the locking bolt 56 positioned in the bolt-receiver 57. The rotary latch 58 is locked against turning back by a blocking disk 59 on which a tension spring 60 acts. An unlocking lever 61 for unlocking the locking device 19 is connected fixedly to the blocking disk 59. By pivoting the unlocking lever 61, the blocking disk 59 is rotated and thus unblocks the rotary latch 58. The pivot arms 50, 51 can then be pivoted in the clockwise direction, as viewed in FIG. 3, into their stowage position within the vehicle floor 13, with the latching bolt 56 emerging from the bolt-receiver 57 due to the released rotary latch 58 being rotated.

Figure 2:
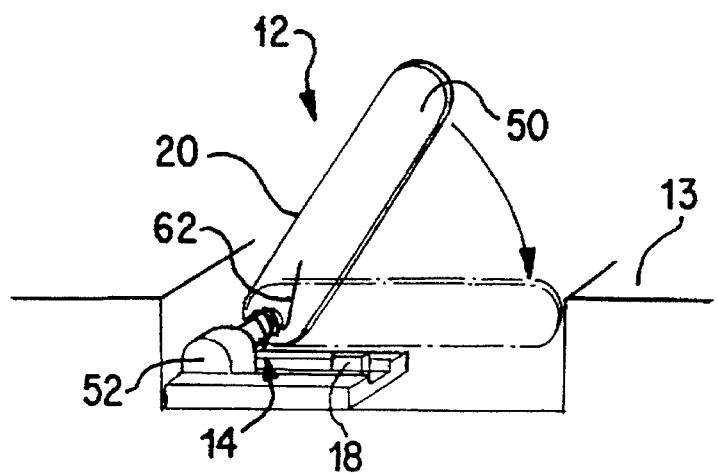
FIG. 2 is a schematic side view during pivoting movement of a front pivot arm in the seat-bench substructure of the rear seat in FIG. 1.

The pivot movement of the pivot arms 50, 51 is indicated schematically in FIG. 2. In the stowage position of the front substructure part 20, the pivot arms 50, 51 are positioned flush in the vehicle floor 13. A torsional leg spring 62 supported at least on a pivot arm 50 and on the retaining web 52 ensures that the pivot arms 50, 51 rest in a frictionally locking manner on, in each case, one rubber block 18 in the vehicle floor 13. Identical leg springs and rubber blocks are also provided for the stowage position of the rear substructure part 21, but are not shown here in any more detail for ease of understanding and brevity.

The releasable connection of the seat bench 10 and seat-bench substructure 12 is effected by a total of four self-engaging locks 63, 64, 65, 66 which can be manually released. The locks 63, 64 are arranged between the upper ends of the pivot arms 50, 51 of the front substructure part 20 and the underside of the seat bench 10; the locks 65, 66 are arranged between the upper side of the transverse carriers 23, 24 of the rear substructure part 21 and the underside of the seat bench 10. The locks 63, 64 are of identical construction. They each have a lock bolt 67, a bolt-receiver 68 for the lock bolt 67, and a blocking lever 69 which engages over the lock bolt 67 positioned in the bolt-receiver 68.

The lock bolt 67 is formed by the transverse web of a clasp 70 projecting on the underside of the seat bench 10 as best seen in FIG. 4. The bolt-receiver 68 is arranged in the upper end of the pivot arm 50 as seen in FIG. 3, and also of the pivot arm 51. The blocking lever 69 is retained pivotably on the pivot arms 50, 51 and engages over the lock bolt 67 with a blocking mouth 691. A torsional leg spring 71 acting on the blocking lever 69 and on the respective pivot arms 50, 51 ensures that the blocking lever 69 is always retained in its locking position.

Rigidly connected to the blocking lever 69 is a release lever 72 (FIGS. 3 and 4) which is intended for opening the lock 63 or 64. The release lever 72 is angled off laterally from the blocking lever 69 and carries a handle 73 at its end. By pivoting the release lever 72 manually, the blocking lever 69 is caused to pivot and its blocking mouth 691 releases the lock bolt 67.

The two locks 65, 66 assigned to the rear substructure part 21 are likewise of identical construction and have the same components as the locks 63, 64 assigned to the front substructure part 20. Differing therefrom, however, the lock bolt 67 is arranged on the upper side of the two transverse carriers 23, 24 and the bolt-receiver with blocking lever and release lever is arranged on the underside of the seat bench 10. The seat-bench-side part of the locks 65, 66 is not shown here, again for ease of understanding and illustration. The lock bolt 67 is formed in each case, in turn, by the transverse web of the clasp 70 fastened on the upper side of the transverse carriers 23, 24 as seen in FIG. 4.

The rear seat 10 is conventionally equipped with at least two safety belts, of which the belt buckle has to be anchored on the vehicle floor. In the case of the rear seat described, the two belt buckles 74, 75 are, for this purpose, anchored at the upper end of the longitudinal carrier 22 of the rear substructure part 21. The tensile forces in the safety belt are absorbed by the vehicle floor 13, via the longitudinal carrier 22 and the retaining webs 25, 26 in the anchorage location 16 in the vehicle floor 13.

Figure 5:
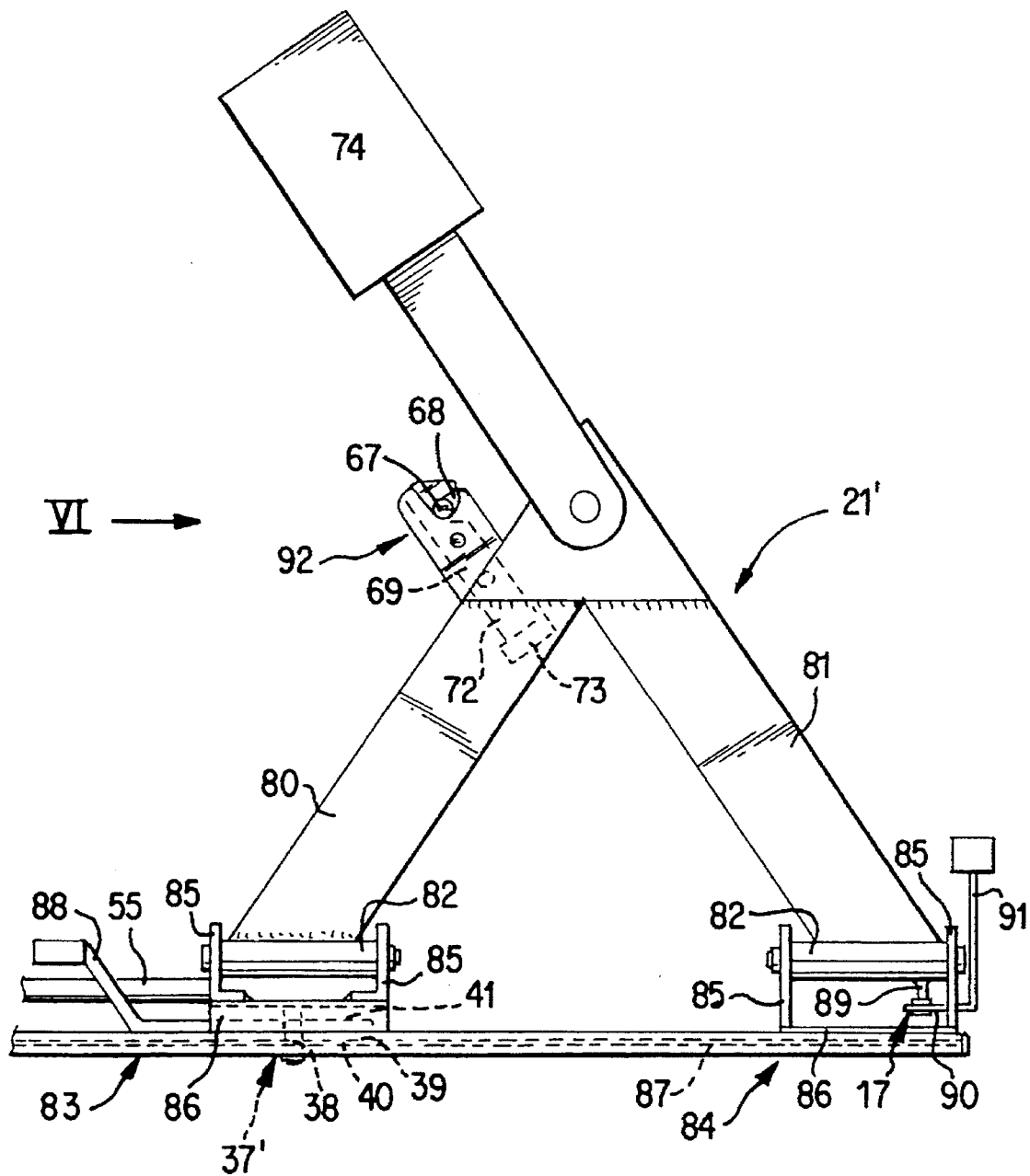
FIG. 5 is a detail of a side view of a seat-bench substructure according to a further embodiment.
Figure 6:
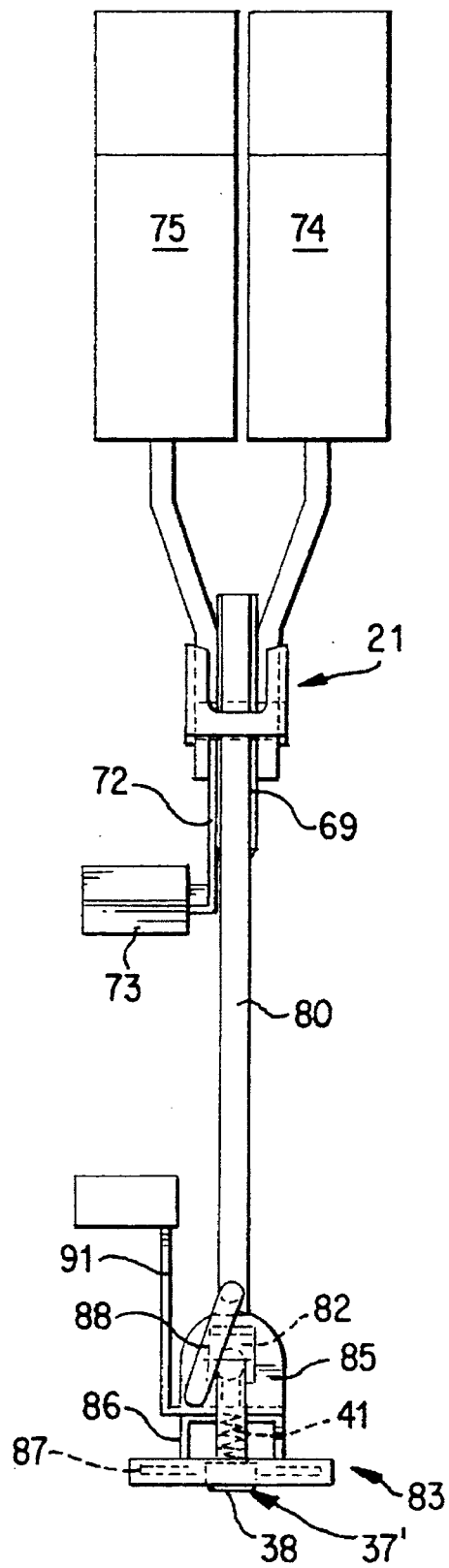
FIG. 6 is a view of the seat-bench substructure detail in the direction of arrow VI in FIG. 5.

FIGS. 5 and 6 show another embodiment of the seat-bench substructure 12. This modification relates exclusively to the configuration of the rear substructure part 21 and comprises two integrally connected rigid carrying legs 80, 81 which project from one another at an acute angle, preferably about 90°, and each bears a pivot pin 82 at the free end. The two carrying legs 80, 81 extend to two anchorage locations 83, 84 which are arranged in the vehicle floor 13 at a longitudinal spacing from one another in the longitudinal direction of the vehicle. The two pivot pins 82 are each mounted pivotably in two longitudinally spaced apart retaining webs 85, with the result that the two carrying legs 80, 81 can be pivoted about two pivot axes which are in alignment with one another and with the longitudinal axis of the vehicle.

In each anchorage location 83, 84, the two retaining webs 85 are fastened on a base plate 86 so as to project vertically therefrom. The two base plates 86 are guided longitudinally displaceably in a guide rail 87, extending in the longitudinal axis of the vehicle, and can be latched into displacement positions in the guide rail 87 via a latching device 37' which is arranged in the anchorage location 83. The latching device 37' is configured identically to the latching device 37 described already with reference to FIGS. 3 and 4 and, in turn, has a latching bolt 38 which can be displaced vertically counter to a latching spring 41 and can engage into latching holes 39, 40 at the base of the guide rail 87 under the action of the latching spring 41.

In order to lift the latching bolt 38 out of the latching holes 39, 40, a disengagement lever 88 is retained on the base plate 86 so that it can be pivoted in the vertical direction and thereby acts on the latching bolt 38. Arranged, in turn, between the front substructure part 20 and the rear substructure part 21' is the connecting rod 55, which likewise acts in a rotationally movable manner on the transverse rod 49 between the pivot arms 50, 51 of the front substructure part 20 and is rigidly connected to the base plate 86 in the anchorage location 83.

The locking device 17 assigned to the rear substructure part 21' takes effect in the anchorage location 84 and comprises a locking bolt 89, arranged at the free end of one carrying leg 81, as well as a bolt-receiver which is fixed on a retaining web 85 and has a locking claw 90 retained pivotably thereon. Connected to the locking claw 90 is a locking lever 91 by way of which the locking claw 90 can be pivoted away from the locking bolt 89 positioned in the bolt-receiver. Thereafter, the entire rear substructure part 21' can be pivoted into the vehicle floor 13 about the pivot pins 82 in the anchorage locations 83, 84, transversely with respect to the longitudinal axis of the vehicle. The vehicle floor 13 likewise receives the rear substructure part 21' in a flush manner, in order to achieve a planar loading surface area.

The connection of the rear substructure part 21' to the seat bench 10 takes place via a single lock 67, which is configured the same as the locks 63, 64, 65, 66 described with reference to FIGS. 1 through 4. Unlike the locks 65, 66 for the rear substructure part 21' which were described therein, here, the lock bolt 67 is arranged on the underside of the seat bench 10 and the bolt-receiver 68 with blocking lever 69 is arranged at the upper connecting end of the two carrying legs 80, 81. The blocking lever 69 is again connected to the release lever 72, carrying the handle 73, in order to unlock the lock 92. The belt buckle 74, 75 for the two rear-seat safety belts are fastened pivotably at the upper connecting end of the two carrying legs 80, 81.

The anchorage locations 83, 84 do not have to be located in the longitudinal axis of the vehicle. For example, they can also be arranged parallel to one another and to the longitudinal axis of the vehicle. In order to pivot the rear substructure part 21' into the vehicle floor 13 in a flush manner, the carrying legs 80, 81 then have to be correspondingly bent off.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A removable rear seat for a motor vehicle with a variable-volume loading space and a planar loading surface area, comprising a rigid seat bench, a seat-bench substructure for fixing the seat height, and anchorage locations for fastening the substructure on the floor of the vehicle body such that the seat-bench substructure is selectively releasably connected, at an end thereof remote from the anchorage locations, to the seat bench and is configured to be retained at the anchorage locations so that it can be pivoted into and out of a use position which predetermines the seat height into a stowage position in one of on and in a vehicle body floor, and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench, and the at least one locking device is associated with each substructure part, wherein the front substructure part has two of the anchorage locations arranged symmetrically with respect to the longitudinal axis of the vehicle, the two anchorage locations having pivot axes extending transversely with respect to the vehicle longitudinal axis, and the rear substructure part has one of the anchorage location arranged centrally on the vehicle longitudinal axis, the one anchorage location having a pivot axis aligned transversely with respect to the vehicle longitudinal axis.

2. The rear seat according to claim 1, wherein the rear substructure part includes a longitudinal carrier pivotably mounted at an end thereof in the one releasable anchorage location between retaining webs and is configured as a box-shaped hollow profile, and two transverse carriers configured as box-shaped hollow profiles are fixedly connected to the longitudinal carrier and extend on opposite sides of the longitudinal carrier, transversely with respect to the vehicle longitudinal axis.

3. The rear seat according to claim 2, wherein the locking device assigned to the rear substructure part includes a locking bolt, arranged between the retaining webs, at least one locking hook which is mounted in a rotationally movable manner on the longitudinal carrier and, in the use position of the seat-bench substructure, is configured to engage over the locking bolt in a positive locking manner, and two latching bolts which are each arranged at the end of a transverse carrier, displaceable axially with respect to the vehicle longitudinal axis and each engageable, under a spring force of an associated locking spring, into latching holes in vehicle body side walls.

4. The rear seat according to claim 2, wherein belt buckles of safety belts assigned to the real seat are fastened at one of an upper end of the longitudinal carrier and at an upper connecting end of the two carriers of the rear substructure part.

5. The rear seat according to claim 3, wherein the locking device includes a hand lever coupled, via Bowden cables, to the latching bolt and the at least one locking hook.

6. The rear seat according to claim 5, wherein the handle lever is operatively arranged on a transverse carrier in a vicinity of a free end thereof bearing the latching bolt and is fixedly connected to a rotatable control disk, and the Bowden cables are operatively fitted on the control disk.

7. A removable rear seat for a motor vehicle with a variable-volume loading space and a planar loading surface area, comprising a rigid seat bench, a seat-bench for fastening the substructure on the floor of the vehicle body such that the seat-bench substructure is selectively releasably connected, at an end thereof remote from the anchorage locations, to the seat bench and is configured to be retained at the anchorage locations so that it can be pivoted into and out of a use position which predetermines the seat height into a stowage position in one of on and in a vehicle body floor, and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench, and the at least one locking device is associated with each substructure part, wherein the front substructure part has two of the anchorage locations arranged symmetrically with respect to the vehicle longitudinal axis, the two anchorage locations having pivot axes extending transversely with respect to the vehicle longitudinal axis, and the rear substructure part has two anchorage locations which are arranged approximately centrally, in the vehicle longitudinal axis, longitudinally spaced from one another and have pivot axes running one of in and parallel to the vehicle longitudinal axis such that the front and rear substructures pivot independently of each other.

8. The rear seat according to claim 7, wherein the rear substructure part comprises two rigid carrying legs connected integrally to one another, the legs projecting away from one another at an acute angle, and, at a free end thereof, are each connected to a pivot pin extending one of in and parallel to the vehicle longitudinal axis, said pivot pin being retained pivotably between two retaining webs arranged in the associated anchorage location.

9. The rear seat according to claim 8, wherein the locking device assigned to the rear substructure part comprises a locking bolt arranged at the free end of a carrying leg, and a bolt-receiver is arranged on the associated retaining web and has a locking claw on which a manual unlocking lever is configured and arranged to act.

10. A removable rear seat for a motor vehicle with a variable-volume loading space and a planar loading surface area, comprising a rigid seat bench, a seat-bench substructure for fixing the seat height, and anchorage locations for fastening the substructure on the floor of the vehicle body such that the seat-bench substructure is selectively releasably connected, at an end thereof remote from the anchorage locations, to the seat bench and is configured to be retained at the anchorage locations so that it can be pivoted into and out of a use position which predetermines the seat height into a stowage position in one of on and in a vehicle body floor and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench and the at least one locking device is associated with each substructure part, wherein for releasable connection of seat bench and seat-bench substructure, self-engaging locks, each with a manually operable release lever, are operatively arranged between the seat bench and the front and rear substructure parts, each of the self-engaging locks includes a lock bolt, a bolt-receiver and a blocking lever which is arranged to engage over the lock bolt positioned in the bolt-receiver and is pivotable counter to a force of a closure spring to open the associated lock via the release lever, the lock bolts are arranged on the underside of the seat bench and are each formed by the web of a U-shaped clasp, and the bolt-receiver, the locking lever, the closure spring and the release lever are arranged at the upper end of the pivot arms of the front substructure part and at an upper connecting end of two carrying legs of the rear substructure part.

11. A removable rear seat for a motor vehicle with a variable-volume loading space and a planar loading surface area, comprising a rigid seat bench, a seat-bench substructure for fixing the seat height, and anchorage locations for fastening the substructure on the floor of the vehicle body such that the seat-bench substructure is selectively releasably connected, at an end thereof remote from the anchorage locations, to the seat bench and is configured to be retained at the anchorage locations so that it can be pivoted into and out of a use position which predetermines the seat height into a stowage position in one of on and in a vehicle body floor, and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench, and the at least one locking device is associated with each substructure part, wherein the front substructure part comprises two pivot arms which are rotationally fixed on a transverse rod mounted rotatably in retaining webs of the anchorage locations and a locking device operatively associated with the front substructure part is effective, in at least one anchorage-position, between one of the pivot arms and an associated retaining web and is releasable via a manual unlocking lever, the retaining webs in the anchorage location of the front and rear substructure parts are longitudinally displaceably arranged in guide rails extending one of parallel to and in the vehicle longitudinal axis, and in at least one anchorage location, a latching device is configured to latch the retaining webs in at least two displacement positions in the guide rail, and the latching device is assigned to an anchorage location of the rear substructure part and has a latching bolt vertically displaceable on the retaining web, and two latching holes spaced apart in the guide rail and into which the latching bolt is arranged to latch under force of the latching spring, as well as an unlocking member which is configured to act on the latching bolt and lift the latching bolt out of the latching hole counter to the force of the latching spring, and a connecting rod connects the front and rear substructure parts to one another extending one of in and parallel to the vehicle longitudinal axis.

12. The rear seat according to claim 11, wherein the unlocking member acting on the latching bolt in the anchorage location of the rear substructure part is a Bowden cable fastened on a control disk of the locking device assigned to the rear substructure part.

13. The rear seat according to claim 11, wherein the connecting rod is rotationally movable on the transverse rod between the pivot arms of the front substructure part and on a longitudinal carrier of the rear substructure part, in the pivot axis thereof.

14. The rear seat according to claim 11, wherein the connecting rod is rotationally movable on the transverse rod between the pivot arms of the front substructure part and is fastened on the retaining web in one of the releasable anchorage locations of the rear substructure part.

15. A removable rear seat for a motor vehicle with a variable-volume loading space and a planar loading surface area, comprising a rigid seat bench, a seat-bench substructure for fixing the seat height, and anchorage locations for fastening the substructure on the floor of the vehicle body such that the seat-bench substructure is selectively releasably connected, at an end thereof remote from the anchorage locations, to the seat bench and is configured to be retained at the anchorage locations so that it can be pivoted into and out of a use position which predetermines the seat height into a stowage position in one of on and in a vehicle body floor, and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench, and the at least one locking device is associated with each substructure part, wherein the front substructure part comprises two pivot arms which are rotationally fixed on a transverse rod mounted rotatably in retaining webs of the anchorage locations and a locking device operatively associated with the front substructure part is effective, in at least one anchorage position, between one of the pivot arms and an associated retaining web and is releasable via a manual unlocking lever, the retaining webs in the anchorage location of the front and rear substructure parts are longitudinally displaceably arranged in guide rails extending one of parallel to and in the vehicle longitudinal axis, and in at least one anchorage location, a latching device is configured to latch the retaining webs in at least two displacement positions in the guide rail, and the vehicle body has side walls in which two latching holes, each assigned to one of the displacement positions, are arranged to receive latching bolts of the locking device assigned to the rear substructure part.

16. A removable rear seat for a motor vehicle with a variable-volume loading space and a planar loading surface area comprising a rigid seat bench, a seat-bench substructure for fixing the seat height, and anchorage locations for fastening the substructure on the floor of the vehicle body such that the seat-bench substructure is selectively releasably connected, at an end thereof remote from the anchorage locations to the seat bench and is configured to be retained at the anchorage locations so that it can be pivoted into and out of a use position which predetermines the seat height into a stowage position in one of on and in a vehicle body floor and at least one manually actuatable locking device operatively associated with the seat-bench substructure to lock the seat-bench substructure in the use position thereof at selected ones of the anchorage positions wherein the seat-bench substructure is a two-part configuration and has front and rear substructure parts, as seen in a longitudinal axis of the motor vehicle, the parts each being retained pivotably in the anchorage locations and are connected releasably to the seat bench, and the at least one locking device is associated with each substructure part, wherein the front substructure part comprises two pivot arms which are rotationally fixed on a transverse rod mounted rotatably in retaining webs of the anchorage locations and a locking device operatively associated with the front substructure part is effective, in at least one anchorage position, between one of the pivot arms and an associated retaining web and is releasable via a manual unlocking lever, in the stowage position of the seat-bench substructure, the front and rear substructure parts rest with contact pressure on the floor of the vehicle body, and a damping element in the form of a rubber block, is arranged, on one hand, between the pivot arms of the front substructure part and one of a pivotable longitudinal carrier and a connecting location of carrying legs of the rear substructure part and, on the other hand, the floor of the vehicle body.

17. The rear seat according to claim 16, wherein leg springs effect the contact pressure and are arranged at a pivot point of the pivot arms and of the longitudinal carrier.

* * * * *